(12) United States Patent
Jiang et al.

(10) Patent No.: US 8,705,047 B2
(45) Date of Patent: Apr. 22, 2014

(54) OPTICAL COHERENCE TOMOGRAPHY IMAGING SYSTEM AND METHOD

(75) Inventors: James Y. Jiang, Hackettstown, NJ (US); Scott Barry, Lafayette, NJ (US); Alex E. Cable, Newton, NJ (US)

(73) Assignee: Thorlabs, Inc., Newton, NJ (US)

( * ) Notice: Subject to any disclaimer, the term of this patent is extended or adjusted under 35 U.S.C. 154(b) by 123 days.

(21) Appl. No.: 13/092,414

(22) Filed: Apr. 22, 2011

(65) Prior Publication Data

US 2011/0255095 A1 Oct. 20, 2011

Related U.S. Application Data

(63) Continuation-in-part of application No. 12/016,484, filed on Jan. 18, 2008, now Pat. No. 7,936,462.

(60) Provisional application No. 60/885,874, filed on Jan. 19, 2007.

(51) Int. Cl.
*G01B 9/02* (2006.01)
*G01B 11/02* (2006.01)

(52) U.S. Cl.
USPC .............................. 356/497; 356/479; 356/450

(58) Field of Classification Search
USPC .......................................... 356/497, 479, 450
See application file for complete search history.

(56) References Cited

U.S. PATENT DOCUMENTS

| | | | |
|---|---|---|---|
| 5,459,570 A | 10/1995 | Swanson et al. | |
| 6,842,254 B2 | 1/2005 | Van Neste et al. | |
| 6,980,299 B1 | 12/2005 | DeBoer | |
| 7,072,046 B2 | 7/2006 | Xie et al. | |
| 7,283,247 B2 | 10/2007 | Okawa et al. | |
| 7,307,733 B2 | 12/2007 | Chan et al. | |
| 7,336,366 B2 | 2/2008 | Choma et al. | |
| 7,359,062 B2 | 4/2008 | Chen et al. | |
| 7,417,740 B2 | 8/2008 | Alphonse et al. | |
| 7,463,362 B2 | 12/2008 | Lasker et al. | |
| 7,936,462 B2 * | 5/2011 | Jiang et al. .................... 356/497 |
| 2003/0046380 A1 | 3/2003 | Steger et al. | |
| 2003/0103212 A1 | 6/2003 | Westphal et al. | |
| 2004/0114211 A1 | 6/2004 | Trepagnier et al. | |
| 2005/0171438 A1 | 8/2005 | Chen et al. | |

(Continued)

OTHER PUBLICATIONS

D. Huang, E.A. Swanson, C.P. Lin, J.S. Schuman, W.G. Stinson, W. Chang, M.R. Hee, T. Flotte, K. Gregory, C.A. Puliafito, and J.G. Fujimoto, "Optical coherence tomography," Science 254, 1178-1181 (1991).

(Continued)

*Primary Examiner* — Tarifur Chowdhury
*Assistant Examiner* — Sunghee Y Gray
(74) *Attorney, Agent, or Firm* — Graham Curtin, P.A.

(57) ABSTRACT

An optical imaging system includes an optical radiation source, a frequency clock module outputting frequency clock signals, an optical interferometer, a data acquisition (DAQ) device triggered by the frequency clock signals, and a computer to perform multi-dimensional optical imaging of the samples. The frequency clock signals are processed by software or hardware to produce a record containing frequency-time relationship of the optical radiation source to externally clock the sampling process of the DAQ device. The system may employ over-sampling and various digital signal processing methods to improve image quality. The system further includes multiple stages of routers connecting the light source with a plurality of interferometers and a DAQ system externally clocked by frequency clock signals to perform high-speed multi-channel optical imaging of samples.

13 Claims, 18 Drawing Sheets

(56) References Cited

U.S. PATENT DOCUMENTS

| | | | |
|---|---|---|---|
| 2005/0206906 A1 | 9/2005 | Chan et al. | |
| 2006/0098207 A1 | 5/2006 | Koch et al. | |
| 2006/0109478 A1 | 5/2006 | Tearney et al. | |
| 2006/0187537 A1* | 8/2006 | Huber et al. | 359/337.22 |
| 2006/0188169 A1 | 8/2006 | Tener et al. | |
| 2007/0035743 A1 | 2/2007 | Vakoc et al. | |
| 2008/0175465 A1* | 7/2008 | Jiang et al. | 382/131 |
| 2009/0046295 A1 | 2/2009 | Kemp et al. | |
| 2009/0066727 A1 | 3/2009 | Lu et al. | |

OTHER PUBLICATIONS

S.H. Yun, G.J. Tearney, J.F. de Boer, N. Iftimia, and B.E. Bouma, "High-speed optical frequency-domain imaging," Optics Express 11, 2953-2963 (2003).

R. Huber, M. Wojtkowski, K. Taira, J.G. Fujimoto, and K. Hsu, "Amplified, frequency swept lasers for frequency domain reflectometry and OCT imaging: design and scaling principles," Optics Express 13, 3513-3528 (2005).

R. Huber, M. Wojtkowski and J. G. Fujimoto, J. Y. Jiang and A. E. Cable, "Three-dimensional and C-mode OCT Imaging with a Compact, Frequency Swept Laser Source at 1300 nm," Optics Express, 13, 10523-10538, (2005).

Yasuno Y. et al. Three-dimensional and high-speed swept-source optical coherent tomography for in vivio investigation of human anterior eye segments. Optics Express, Dec. 2005, vol. 13, No. 26, pp. 10652-10664.

Vakoc B.J. et al. Phase-resolved optical frequency domain imaging. Optics Express, Jul. 2005, vol. 13, No. 14, pp. 5483-5493.

International Search Report and Written Opinion of the International Searching Authority for related International Application No. PCT/US2008/051412, mailed Aug. 8, 2008.

Huber, R. et al. Three-Dimensional and C-mode OCT imaging with a compact, frequency swept laser source at 13000 nm. Optics Express, Dec. 2005, vol. 13, No. 26, pp. 10523-10538.

* cited by examiner

Figure 1. An embodiment of an optical coherence imaging system with microscope sample interface. PC: polarization controller, CIR: circulator, DC: dispersion compensator, D: detector.

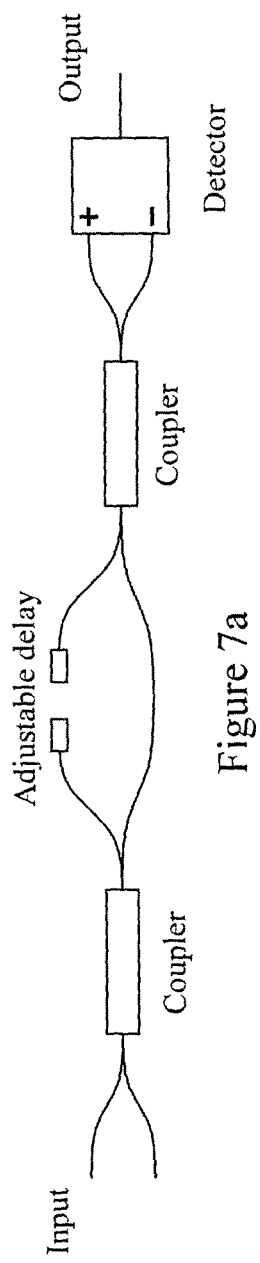
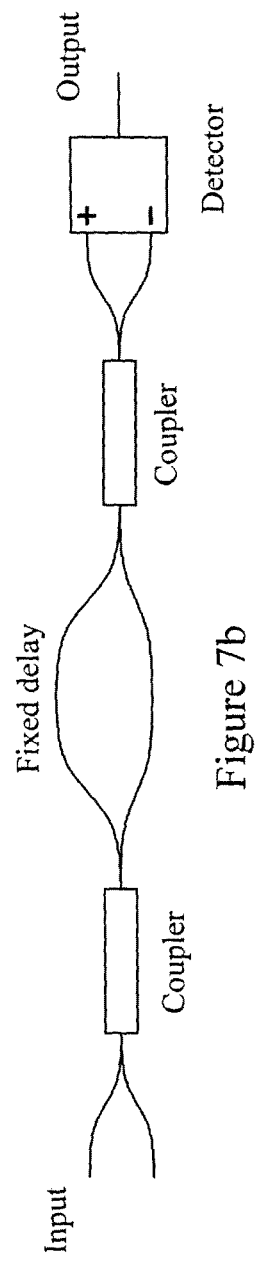
Figure 7a
Figure 7b

OPTICAL COHERENCE TOMOGRAPHY IMAGING SYSTEM AND METHOD

This application is a continuation-in-part of U.S. application Ser. No. 12/016,484, filed Jan. 18, 2008, which claims the benefit of U.S. Application 60/885,874, filed Jan. 19, 2007, now expired, the contents of each of which are incorporated herein by reference.

INTRODUCTION

This application relates to a new OCT imaging system and methods for improving the efficiency, speed, and quality of the acquisition, generating, and display of one dimensional or multi-dimensional OCT images.

Optical coherence tomography (OCT) is an emerging imaging technology based on low-coherence interferometry that enables non-invasive, cross-sectional imaging of a sample with micrometer scale resolution. It has been demonstrated that Fourier domain OCT (FD-OCT) techniques can significantly improve the sensitivity and imaging speed of an OCT system. In FD-OCT systems, the interference fringe signals are recorded as a function of optical frequency at high-speed using a broadband light source and a spectrometer pair, or a frequency swept source and a detector pair. After analyzing the interference fringe signals, the depth-encoded reflectivity profiles of the sample are retrieved and used to construct the OCT images.

A frequency swept source has been demonstrated to have many advantages for OCT imaging because it enables high efficiency detection of back-reflected signals from the sample via a balanced detection scheme. Such high signal collection efficiency is essential for high-speed detection of very weak signals reflected from deeper regions in a sample. However, a swept source based OCT system has some drawbacks. First, because the scanning wavelength of a high-speed tunable laser is usually not linear in optical frequency space, recorded OCT data points must be recalibrated from time domain to equally spaced data points in optical frequency. A frequency clock module connected to the laser is typically used to provide the frequency clock signals of the laser as the recalibration reference. This recalibration process can be time-consuming because it must be performed for each scan of the laser corresponding to one axial line (A-scan) in the constructed OCT image, which greatly limits the real-time imaging speed of conventional OCT systems. Second, in the dynamic process of actively tuning the laser frequency, the laser undergoes significant changes in cavity conditions (i.e., cavity length, average mode number, or number of modes), which cause both intensity and phase instabilities and noise in the laser output. The intensity noise and phase noise degrade detection sensitivity and final image quality. This is a problem that cannot be completely resolved by the balanced detection method.

SUMMARY OF THE INVENTION

This application discloses a method to improve OCT signals processing and imaging speed: The frequency clock signals of the source are processed to obtain a pulse train containing the relation of the optical frequencies of the source and the time. The pulse train is connected to the external clock signals input of the data acquisition (DAQ) device. The DAQ converts the input OCT interference signals at each pulse in the pulse train and transfer the converted data points to computer memory. This operation mode of the DAQ system advantageously relieves the data transfer load of the computer data bus and simplifies OCT signal processing. Embodiments of using both hardware and software methods to achieve this goal are disclosed.

Also disclosed are methods to improve OCT imaging quality: By over-sampling the OCT signals and frequency clock signals, and applying various algorithms to digitally process the over-sampled data points to improve signal quality and reduce the amount of data points needed to be transferred to computer memory, the OCT image quality can be significantly improved without compromising the imaging speed.

Additionally, disclosed are methods of computer processors controlling the overall operation of the imaging system to employ parallel data acquisition and signal processing routines. Parallel processing is important for real-time high-speed signal acquisition and image construction because the computer is not idle while the DAQ fills the data buffers.

A multiple-channel OCT imaging system that generates high quality OCT images at high speed from multiple-channels simultaneously is also disclosed. The system employs multiple stages of routers to route (i) the optical output of the source to illuminate a plurality of interferometers, and (ii) the optical or electric output of the interferometers to the detectors and DAQ system. In this manner, the imaging system can provide multiple OCT imaging channels for a single or a plurality of samples.

A real-time video-rate OCT microscope using swept source is demonstrated as an embodiment of the inventive system and method.

BRIEF DESCRIPTION OF THE DRAWINGS

Embodiments of the invention are particularly pointed out and distinctly claimed at the conclusion of the specification in the claims. The foregoing and other objects, features and advantages of exemplary embodiments of the invention will be apparent from the following detailed description taken in conjunction with the accompanying drawings.

FIGS. 7a and 7b illustrate exemplary embodiments of a frequency clock module of an optical imaging system;

DETAILED DESCRIPTION OF THE PREFERRED EMBODIMENTS

Figure 1:
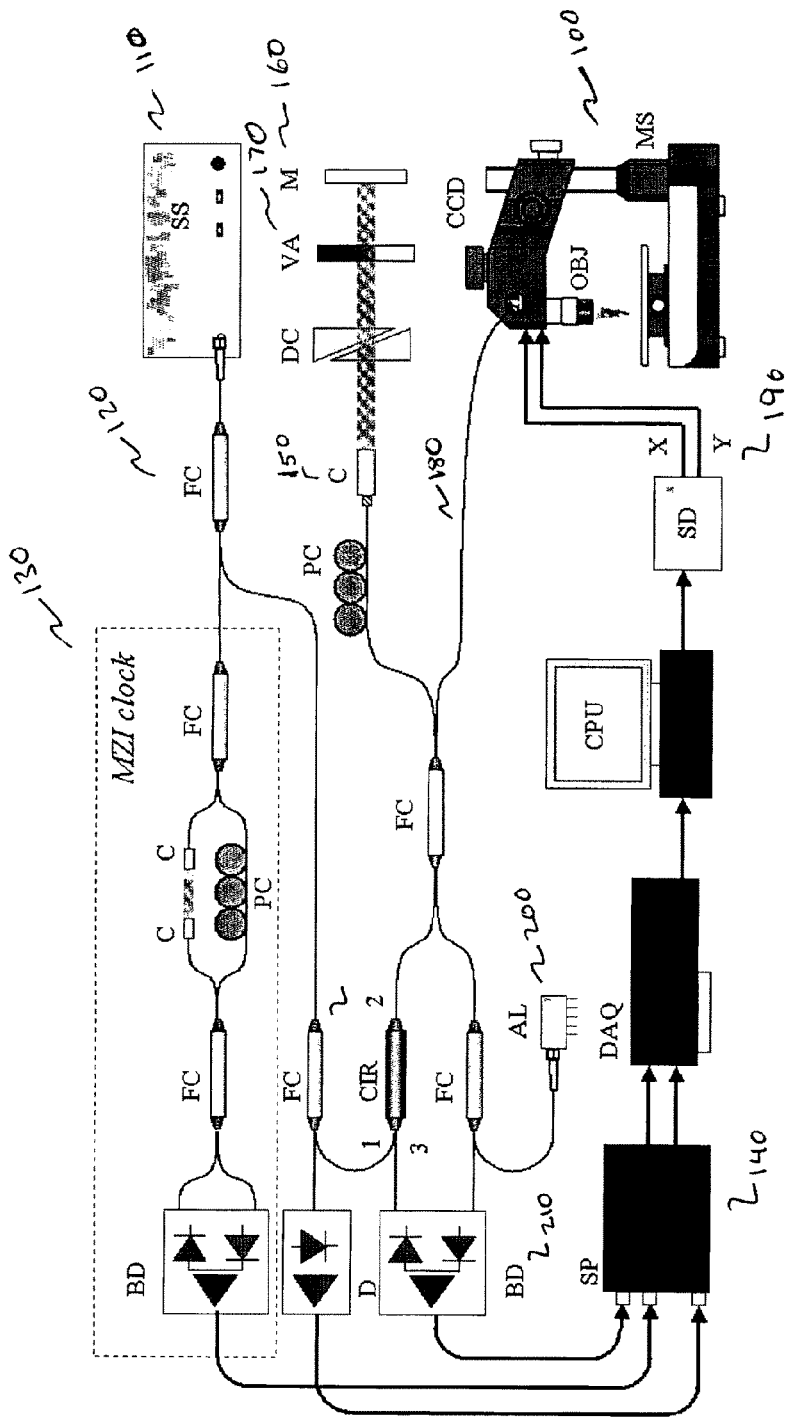
FIG. 1 illustrates an exemplary embodiment of an optical coherence imaging system with microscope sample interface.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

1. Principle of Swept Source OCT

In swept source Fourier domain OCT, a light source outputs optical frequencies as a function of time. The light is coupled to a sample and a reference reflector using an optical interferometer. Back reflected or back scattered light from different depths within the sample is combined with light from the reference reflector to form OCT interference fringe signals. After converted to electric signals by a photodiode detector, the OCT signals are digitized by a DAQ device to discrete digital data points. A Fourier transform is applied to the data points to detect the echo time delay and amplitude of the back reflected light from different depths within the sample and to construct cross-sectional images of the sample.

An interference signal detected by a single photodiode, as a function of optical frequency, is expressed as:

$$I_{PD}(\omega) = I_R(\omega) + 2\sqrt{I_R(\omega)I_S(\omega)}\cos(\Delta\phi(\omega)) + I_S(\omega) \quad (1)$$

where $I_R(\omega)$ and $I_S(\omega)$ are the optical frequency dependent intensities reflected from the reference and sample arms; $\Delta\phi(\omega)$ is the optical frequency dependent phase difference between the reference and sample arms; $\omega=\omega(t)$ is the optical frequency sweep profile as a function of time. The interference term on the right hand side of Eq. (1) is expressed as:

$$I_{int}(\omega) = 2\sum_n \sqrt{I_R(\omega)I_n(\omega)} \cos\left[\frac{\omega}{c}z_n\right] \quad (2)$$

where $I_n(\omega)$ is the intensity of light reflected from the n-th layer in the sample and can be expressed as $I_n(\omega)=R_n(\omega)I_{SS}(\omega)$; $R_n(\omega)$ is the optical frequency dependent reflectivity from the n-th layer; $I_{SS}(\omega)$ is the original spectrum of the swept source; and $z_n$ is the depth of the n-th layer. It is supposed that the attenuation for the reference arm light is uniform for all frequency components: $I_R(\omega)=\mu^2 I_{SS}(\omega)$, where $\mu^2$ is the attenuation coefficient.

When a balanced detection scheme is employed in the interferometer, there is a 180-degree phase shift between the interference signals that occur in the two interference channels connected to the balanced detector. Since the output from the balanced detector is the difference between the two input channels, the subtraction of these two signals adds the second term but subtracts first and third terms in Eq. (1). In the ideal case where the two input channels of the balanced detector are perfectly balanced, the output from the balanced detector is given by:

$$I_{BD} = 4\sum_n \sqrt{I_R(\omega)I_n(\omega)} \cos\left[\frac{\omega}{c}z_n\right] \quad (3)$$

$$= 4\mu I_{SS}(\omega) \sum_n \sqrt{R_n(\omega)} \cos\left[\frac{\omega}{c}z_n\right]$$

Eq. 3 reveals the fact that the optical reflectivity $R_n(\omega)$ from the n-th layer $z_n$ is linearly encoded in the frequency of the sinusoidal function $$\cos\left[\frac{\omega}{c}z_n\right].$$

The deeper that the reflection occurs (corresponding to a larger $z_n$ value), the higher the frequency in the detected interference signals. Applying a Fourier transform to the interference fringe signals decomposes the mixed signals into differentiate frequency components. The amplitude of the frequency component is in proportional to the light reflectivity from a certain depth. Therefore, a complete depth profile of a sample can be measured by plotting the Fourier transformed amplitude as a function of frequency. When the incident beam performs another one dimensional or two dimensional scans across the sample surface, 2D or 3D OCT image data of the sample can be acquired and displayed.

The sweep profile $\omega=\omega(t)$ is determined by the scanning mechanism (i.e., sinusoidal) of the wavelength tuning component within the laser. The nonlinear nature of this tuning curve requires that the resulting OCT signals be recalibrated from equally spaced sample points in time to equally spaced sample points in frequency. A frequency clock module is used to monitor the output frequency of the laser, by generating an interference fringe signals from a fixed delay in another optical interferometer. This calibration process can be performed by hardware or software to linearly map the acquired OCT interference signal data points to optical frequency domain.

2. Methods and Systems 2.1 Optical Coherence Tomography Imaging System

FIG. 1 is a schematic of an embodiment of an optical coherence tomography imaging system using a microscope (MS) 100 as the sample interface. The light source (SS) 110 is, for example, a rapidly swept external cavity laser with a wavelength sweep range from 1250 nm to 1400 nm at scan frequency of 16 kHz (8 kHz forward and 8 kHz backward for an total effective scan rate of 16 kHz). The typical 3 dB spectral bandwidth is measured to be >110 nm, and the typical average output power is 16 mW.

The main optical output of the laser is split by a 99:1 fiber coupler (FC) 120. One percent of the laser output is connected to a Mach-Zehnder Interferometer (MZI) 130 as the frequency clock module to produce frequency clock signals. The frequency clock signals can be processed by a signal processing board (SP) 140 to generate electrical pulses that are equally spaced in optical frequency. The frequency clock signals can also be processed by software, after digitization of the signals, to generate a digital record containing the frequency-time relationship of the laser. The frequency clock signal forms the basis of the recalibration routine and will be described in detail below. Another one percent of the laser output is tapped to record the temporal intensity profile of the source.

The rest of the main laser output is routed to a fiber based Michelson interferometer through another fiber coupler (FC). In the reference arm of the interferometer, the beam exiting from the fiber is collimated in collimator (C) 150 and reflected by a stationary mirror (M) 160 back into the fiber. A manual or electronically controlled variable attenuator (VA) 170 is used to adjust the reference power to a proper level for better detection sensitivity. In the sample arm, the fiber 180 is connected to a microscope head, and the beam exiting from the fiber is also collimated and directed by a XY scanner (SD) 190 toward the sample. The sample is placed on an XY translation stage mounted on the microscope. An infinity corrected long working distance objective (OBJ) is used for focusing the beam onto the sample. The long working distance of the objective provides a large clearance (>20 mm) between the optics and the sample, which enables easy handling of the sample. A 45° incidence cold mirror is inserted into the beam path to reflect the visible light from the sample onto a CCD camera that records conventional video microscope images of the sample. An aiming laser 200 centered at 632 nm (which can be seen by a human eye), or at 780 nm (which can be detected by the CCD camera), is coupled to the sample arm of the interferometer to indicate the laser scanning position on the sample. A balanced detector (BD) 210 (i.e., PDB140C, Thorlabs®, Inc.) with 3 dB cut-off frequency of 15 MHz, optimized for low DC-offset (<1 mV) and high impedance gain (>180,000 V/A), is used to record the interference fringe signals in the Michelson interferometer. The interference fringe signals are connected to a signal processing board (SP) 140. The signal processing board processes the output of the MZI frequency clock 130 signals to generate a pulse train with equal spacing in optical frequencies. A 14-bit digitizer is configured in external clock mode to use the pulse train as trigger signals to sample the OCT signals. The digitized data points are equally spaced in optical frequency so no additional frequency recalibration is needed. Fourier Transform is applied to the data points and generates the depth-dependent reflectivity profile of the sample. The computer also generates waveforms through an analog output board to control the XY beam scanning in the microscope head, to perform 2D or 3D OCT imaging of the sample. Also shown in FIG. 1 is optical detector D.

2.2 Swept Source

Figure 2:
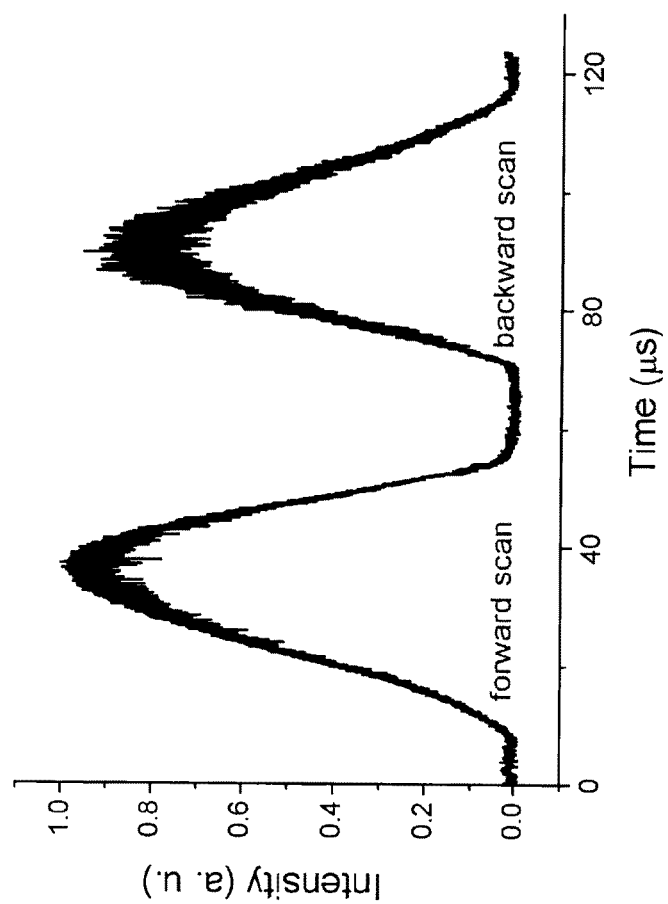
FIG. 2 illustrates an exemplary temporal intensity profile of a swept source showing a forward and a backward scan.

The light source 110 may be a swept source used in the imaging system is similar to that described in U.S. Patent Publication No. 2006/0203859. Briefly, the swept source includes a semiconductor gain chip with one partial-reflection coated facet that serves as the output coupler of the laser, and another with anti-reflection (AR) coated facet toward the intra-cavity. The beam exiting from the AR coated facet of the chip is collimated by an aspheric lens to illuminate a diffraction grating. The light diffracted by the grating is collected by an achromatic doublet lens and focused onto a highly-reflective mirror covered by a 10-µm slit. The grating is mounted on a resonant galvanometer scanner that rotates about its axis. When the grating is rotating, the slit provides wavelength selection and feedback of the selected wavelength into the cavity, thus enabling high-speed sweeping of the output optical frequency of the laser. The measured temporal intensity profile of the swept source for a forward and a backward scan is shown in FIG. 2. The temporal intensity profile contains noise which is from the residue interference effects within the laser cavity such as the etalon effect of the semiconductor gain chip. This interference signal can be used as the frequency clock signal of the source since it is intrinsic in the laser output and used to externally clock the acquisition of OCT signals.

2.3 Frequency Clock Module

In Fourier domain OCT, as required by Eq. (3), the OCT signals must be re-sampled into linear frequency space, so adjacent data points have an equal optical frequency interval. Fourier transform can then be applied to accurately recover the depth-dependent sample reflectivity information. The photo-detectors detect the interference fringes as a function of time. However, because the optical frequency sweep of the laser is determined by its sweep mechanism, or through application of external driving signals, the resulting sweep of the laser frequency output is typically not linear in time and simple sampling of the detector signal using a fixed time base results in significantly degraded image quality. Therefore, a frequency reference or a digital record containing the time-frequency relationship of the laser must be established prior to the recalibration process. The recalibration process maps the OCT data points to equal spacing in optical frequency domain. Applying Fourier transforms to the recalibrated OCT data points yields the depth profiles of the samples.

A Mach-Zehnder Interferometer (MZI) is used as the frequency clock module. The MZI can have a fixed delay between its two arms or have a translation stage to control the path length difference d between the two arms. Changing d changes the frequency of the resulting MZI clock signal. Another balanced detection detector (for example, a Thorlabs® PDB120C, 80 MHz) is used to record the interference fringes of the MZI. The output of the MZI balanced detector is a sinusoid wave similar to Eq. 3 and can be expressed as below:

$$I_{MZI} = 4I_{SS}(\omega)\cos\left[\frac{\omega}{c} \cdot d\right] \quad (4)$$

Although ω(t) is usually not linear in time, all the maximas and zero-crossings (4 points per MZI fringe cycle) in a signal measured as a function of time are equally spaced in frequency. The Free-Spectral Range of the MZI clock is given by:

$$FSR_{MZI} = c/d \quad (5)$$

The number of MZI fringe cycles per laser swept is given by:

$$N_{MZI\_fringes} = \frac{(\omega_{max} - \omega_{min}) \cdot d}{2\pi \cdot c} \quad (6)$$

where $\omega_{max}$ and $\omega_{min}$ are the maximum and minimum angular frequencies of the swept source. For a wavelength scanning range of 1240 nm to 1380 nm, when the delay d is set at 6 mm, the FSR is approximately 50 GHz and one scan of the laser generates approximately 480 fringe cycles. If two data points are taken per MZI cycle, a total number of ~1000 points can be generated as the frequency reference for sampling the OCT interference fringe signals.

Since the MZI delay can be continuously adjustable, and the number of data points per MZI cycle can be 2 or 4 or other numbers, the MZI clock module is very flexible in generating the required number of frequency reference data points for swept source OCT applications. Applying the balanced detection of the MZI clock signal is a very effective method to remove the DC term in the detected signal and double the contrast of the interference fringe signals.

2.4 OCT Data Acquisition Externally Clocked by Frequency Clock Signals

The frequency clock signals can be processed by software or hardware to externally clock the acquisition of OCT signals. In conventional SS-OCT systems, the OCT signals are recorded simultaneously with the clock signals by a two channel high-speed digitizer. A software algorithm analyzes the clock signals to build a digital record containing the frequency-time relationship for every laser scan. This digital record is then used to recalibrate the acquired OCT signal into linear frequency space. This approach requires sampling both the OCT data channel and frequency clock signal channel. Since the laser can be scanning at a very high speed, the data transfer load from the DAQ device to the computer memory is very large, often exceeding the data transfer bandwidth of the data bus (i.e., PCI bus). The data bus bandwidth limits the maximum data that can be processed by the computer processor and the OCT system imaging speed.

In view of the problems of the prior art, an embodiment of the present invention includes an OCT system, which uses the frequency clock signal to externally clock the DAQ device to sample the OCT interference signals. This may advantageously reduce the amount of data needed to be transferred from the DAQ device to the computer memory. The triggering mechanism can be an electrical pulse train input to the DAQ device, or a copy of digital record residing in or uploaded to the DAQ board. The electrical pulse train and the digital record are generated by hardware or software processing of the frequency clock signal. Using this method, the recalibration process of the OCT signals is done in the DAQ device and only the data points required for OCT image construction are transferred via the computer data bus. Certain experimental systems showed a decrease of the data transfer load of the data bus by a factor of at least 2-5. In addition, the recalibration process is moved from the computer processor to the DAQ device which alleviates the computation load of the computer processor to allow the processor more duty cycle for performing other tasks like Fourier transform, logarithm calculation and display of the multi-dimensional image data.

This method is very useful for reducing the data transfer load in high-speed OCT imaging systems, since the output frequency of the laser is usually nonlinear in time. This method can be also applied to other applications requiring, for example, high speed analog to digital conversion, high density sampling of raw signals, and a nonlinear time base. Uploading a digital record, which contains the nonlinear time base information and can be dynamically modified, to the DAQ device allows the DAQ device to use this digital record to externally clock the data acquisition processes for all signal channels input to the DAQ device. Only the data points that are in a particular relationship with the digital record are processed and transferred to memory devices, while other redundant data points are discarded or not transferred. This method requires less bandwidth and less time for transferring the data points, shares some data processing load of the main processor, thus advantageously improves the speed and efficiency for the applications.

Another embodiment of the invention provides a hardware method for accelerating the recalibration of OCT signals from time to frequency space using a signal processing board. The signal processing board processes the frequency clock signals to generate clock pulses that indicate when the output optical frequencies of the source have a linear relationship. The digitizer is configured in external clock mode, and the clock pulses output from the signal processing board are connected to the external clock input of the digitizer to serve as the time base for the analog to digital conversion of the OCT signal channel. In this mode, the OCT signals are digitized into data points with equal spacing in the optical frequency domain, ready for Fourier transform to generate the depth profiles of the sample and construct OCT images.

Figure 3:
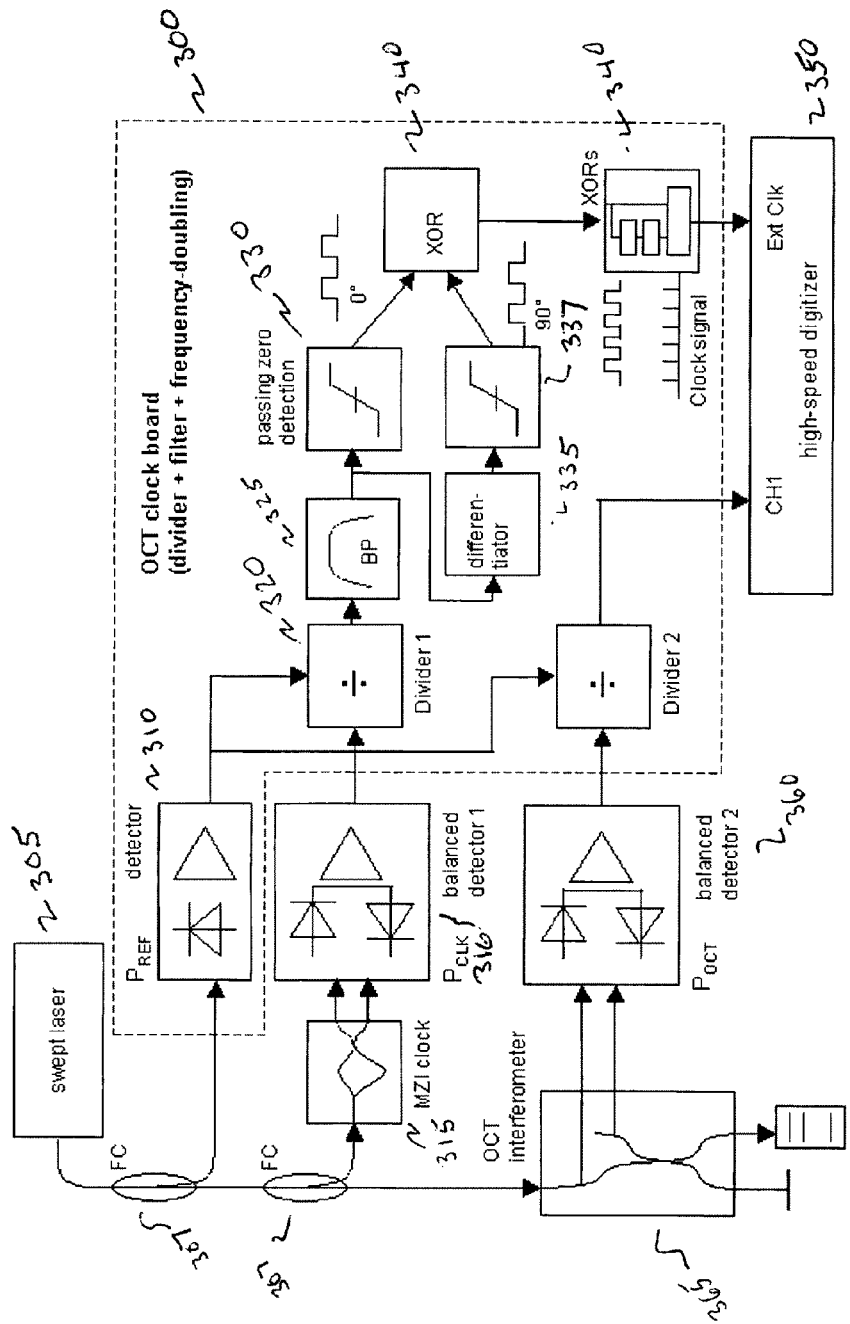
FIG. 3 illustrates an exemplary hardware signal processing board schematic according to an embodiment of the invention.

FIG. 3 is an illustrative schematic of an example SS-OCT signal processing board. The signal processing board 300 generates pulse trains with the pulses indicate when the output optical frequencies of the source have a linear relationship. The pulse trains are connected to the external clock input of the DAQ card, to serve as the time base to synchronize the data acquisition of OCT signals. In the example of FIG. 3, fiber couplers 307 are used to split the light from a swept source 305. A small portion (~1%) of the laser output $P_{REF}$ from swept source 305 is monitored by an on-board optical detector 310 (typically a photodiode). The detection bandwidth is chosen to be higher than the maximum frequencies generated by the MZI clock 315 to prevent signal aliasing. The laser scanning frequency signal from the MZI clock $P_{CLK}$ from the output of the balanced detector 1 316 is divided by $P_{REF}$ at Divider 1 320. This division normalizes the measurement data to the time dependent laser power curve. A 2.5-7.0 MHz band-pass filter 325 designed for a 20 kHz scanning laser is used for bandpass filtering the frequency clock signal. The bandpass filter rejects the low frequency and high frequency noises on the clock signals and reduces the errors from the decision circuit 330 in later stages of the signal processing board. The decision circuit 330 is a fast voltage comparator with a reference voltage setting at zero, so all the zero-crossings in the clock signals are converted to digital pulses indicating the time when the output optical frequencies of the source have a linear relationship. If more valid pulses for sampling the OCT interference fringes are required, a frequency doubling circuit is used. A differentiator 335 generates the first order derivative of the clock signal and converts all the peaks to zero-crossings. Another voltage comparator 337 receives the output from the differentiator and generates a second set of digital pulses. The two sets of digital clock pulses are phase shifted by 90 degrees and are combined by XOR digital logic circuits 340 into frequency doubled clock pulses. Depending on the XORs logic design, 2 or 4 pulses per MZI fringe cycle can be generated. The original or the frequency doubled clock pulses are connected to the external clock input of DAQ device 350 to externally clock the analog to digital conversion process. In the case of 2 pulses per MZI fringe cycle, the clock pulses have a typical frequency range from 4-14 MHz when a swept source as described in section 2.2 is used; other sources may have significantly different clock frequencies. This method can be adapted to provide a higher number of clock pulses per MZI fringe cycle if required. As shown in FIG. 3, a balanced detector 360 couples the interference fringe signals from the interferometer 365 to the OCT clock board 300.

2.5 Parallel Computing

Figure 13:
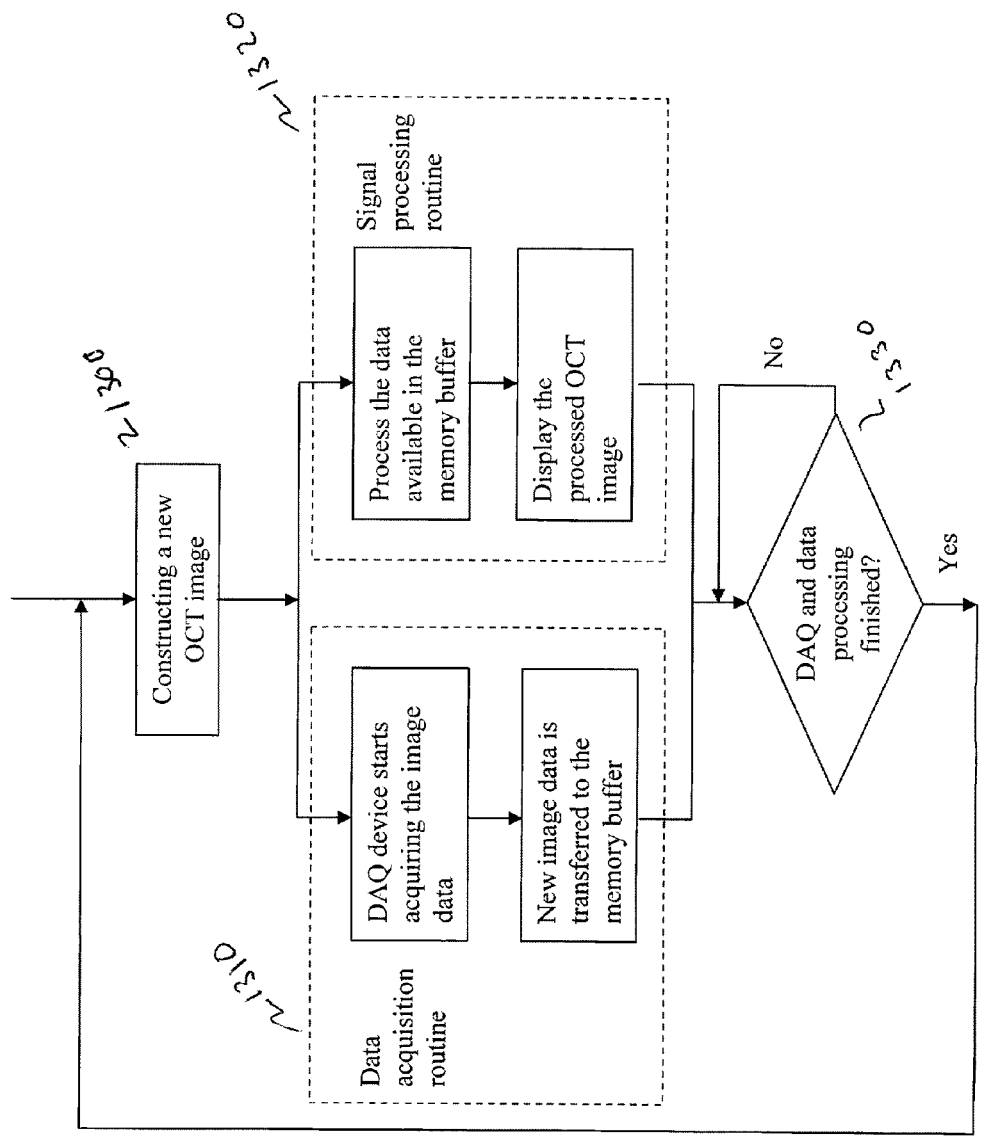
FIG. 13 illustrates, in block diagram form, an exemplary method realized in accordance with the principles of the present invention.

In an example embodiment software configures the data acquisition routine and signal processing routine in parallel. The software controls the DAQ device to start the data acquisition routine; and without waiting for the data acquisition routine to be finished, the software starts the signal processing routine to process the previously acquired data stored in memory; the software then checks the data acquisition status after processing a certain amount of previously acquired data. The flow chart shown in FIG. 13 illustrates the principles of the image construction routine.

2.6 Signal Enhancement by Over-Sampling OCT and Frequency Clock Signals

Further disclosed is a method to enhance signal and image quality in an OCT imaging system. The method includes over-sampling the OCT signals and frequency clock signals at a sampling density higher than required by Nyquist sampling theory and utilizing the on-board processing power of the DAQ device or computer processor to process the over-sampled data points according to the processed frequency clock signals—a digital record that contains the frequency-time relationship of the source. Various signal processing algorithms can be applied to significantly improve signal strength, image contrast, and image quality.

Over-sampling the OCT signals increases the amount of data points that can be processed to produce images. Since many balanced detectors convert the received photons into electric current, and a trans-impedance gain module inside the balanced detector converts the current into voltage output, for a continuous wave (CW) light source like a swept source or a super luminescent diode, sampling the OCT signals at a higher density means better photon detection efficiency and better system sensitivity. The recalibration process picks out the data points that are linearly spaced in optical frequency domain and throws out other data points that are still valid points representing the optical interference fringe signals. By using, for example, specially designed algorithms to process the over-sampled data points and salvaging the photons that are discarded in conventional OCT signal processing methods, the OCT signal strength can be increased, signal-to-noise can be enhanced, and the final image quality can be significantly improved.

Over-sampling of the frequency clock signals produces more data points to represent the raw signals, thus the frequency-time relationship of the laser scans can be measured more precisely. An accurate frequency-time relationship of the laser is critical for recalibration of the raw OCT signals from time into optical frequency space. As a result of over-sampling the frequency clock signals, the resolution and signal-to-noise ratio of OCT images can be significantly improved, and some imaging artifacts are reduced or totally removed.

The algorithms that can be used for processing over-sampled OCT signals include, for example:

1. Multiple data points are averaged to be one data point according to a digital record containing the frequency-time relationship of the source; Fourier transform is applied to the averaged data points to construct a depth profile of the sample. Alternatively, multiple sets of the OCT data points are generated from the over-sampled OCT data points according to multiple sets of digital records containing the frequency-time relationship of the same source; Fourier transforms are applied to each set of OCT data points. The outputs of Fourier transforms of multiple sets of OCT data points are averaged into one set to construct a depth profile of the sample.

2. The over-sampled OCT data points are stored in memory and compared with another set of over-sampled data points to improve signal to noise ratio, enhance image resolution or contrast, or enhance phase, polarization and spectrum information. The other over-sampled data points used for the comparison can be acquired from previous scans of the laser, or from other signal channels acquired simultaneously with a current channel, or from a pre-calculated data set stored in the memory device.

3. The over-sampled OCT data points are averaged according to a digital record containing the frequency-time relationship of the source. A Fourier transform of the averaged OCT data points generates intensity and phase information. The intensity information is averaged to construct a depth profile of the sample. The phase information is averaged to provide information about sample position and motion, or various sample properties to the incident light conditions. The various sample properties include, for example, optical birefringence, absorption, fluorescence emission spectrum, optical harmonic generation, and other linear or nonlinear optical properties of the sample.

4. The over-sampled OCT data points are averaged according to the processed frequency clock signals. A Fourier transform of the averaged OCT data points generates intensity and phase information. The intensity and phase information are compared with another data set in the memory or acquired from another signal channel simultaneously or non-simultaneously. The compared intensity information is used to construct a depth profile of the sample. The intensity information can be averaged and digitally interpolated to improve the resolution in detecting of certain reflection layers in the sample. The compared phase information is averaged to provide highly sensitive information about, for example, sample position, motion of particles in the sample, or various sample properties under incident light conditions. The various sample properties, for example, include optical birefringence, absorption, fluorescence emission, optical harmonic generation, and other linear of nonlinear optical properties of the sample.

2.7 Multiple-Channel OCT Imaging System

Also disclosed herein is an OCT imaging system for acquiring high quality image data from multiple samples simultaneously. The system employs multiple stages of routers to multiplex a plurality of OCT imaging channels with one light source. Each light source has a frequency clock module to externally clock the DAQ device acquisition of the imaging channel that is illuminated by this light source. The DAQ device has multiple input channels for the plurality of OCT imaging channels and the image data from multiple channels is acquired simultaneously or by using time-multiplexing. In this multiple-channel OCT imaging system, the DAQ process is externally clocked by the processed frequency clock signals from the frequency clock module serving each light source, which results in very efficient data acquisition and processing, and very high imaging speed. In this multiple-channel OCT imaging system, the over-sampling methods of OCT signals and frequency clock signals may also be applied to improve the OCT image.

3. Additional System and Method Embodiments

Figure 4:
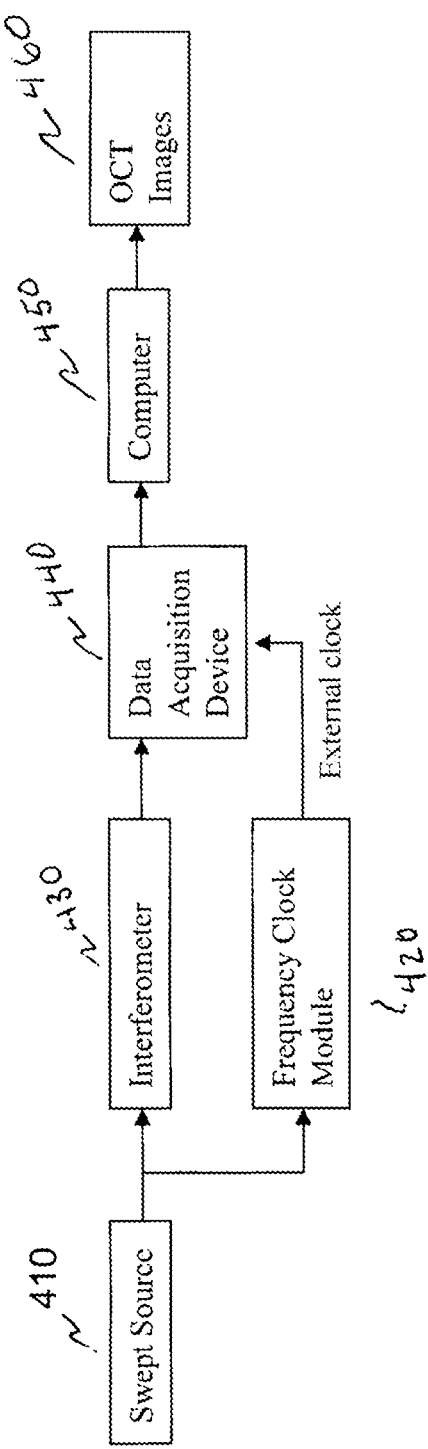
FIG. 4 illustrates an exemplary optical imaging system according to an embodiment of the invention.

FIG. 4 is an embodiment of a system for performing optical imaging of a sample. This system includes an optical radiation source shown as a swept source 410. The swept source 410 outputs its optical frequencies as a function of time. A frequency clock module 420 monitors the output optical frequency of the swept source 410 and outputs frequency clock signals. The system also includes an optical interferometer 430 which receives an output from the swept source 410 and an optical detector to detect the interference fringe signals from the interferometer and convert them to analog electrical signals. The optical detector may be an embedded module in the optical interferometer 430 or external to an optical interferometer (see FIG. 1 optical detector D). Although the optical interference happens inside an optical interferometer with or without the optical detector. The system further includes a DAQ device 440 to convert the analog electric signals to digital data points. The data acquisition is externally clocked by the frequency clock signals. A computer controls 450 the DAQ system, processing of the digital signals, and construction of the depth profiles, and multi-dimensional images 460 of the sample.

Figure 5:
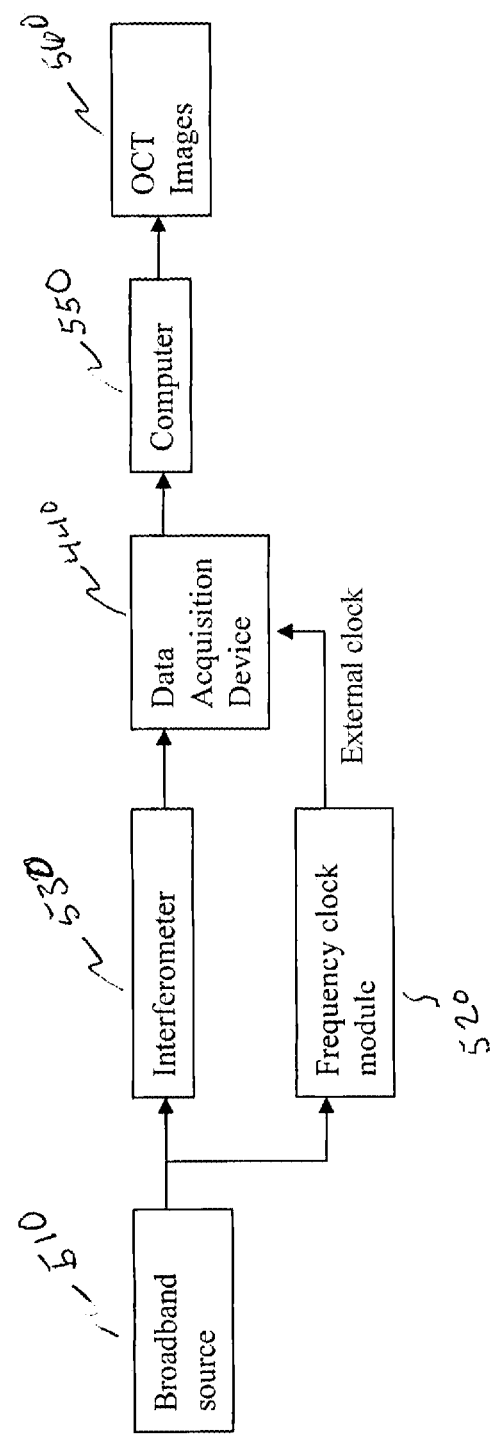
FIG. 5 illustrates an exemplary optical imaging system according to another embodiment of the invention.

FIG. 5 is an embodiment of a system for performing optical imaging of a sample. The optical radiation source 510 has a broadband spectral output and outputs all optical frequencies simultaneously. The broadband source 510 illuminates an interferometer 530 and produces OCT interference fringe signals in optical frequency domain. A digital record is used as the frequency clock signal from the frequency clock module 520 to externally clock the data acquisition of OCT signals from a spectrometer. A computer 550 controls the DAQ system 440, processing of the digital signals, and construction of the depth profiles, and multi-dimensional images 560 of the sample. The digital record is generated from an optical wavelength meter or an optical spectrometer as the frequency clock module 520 of the light source.

Figure 6A:
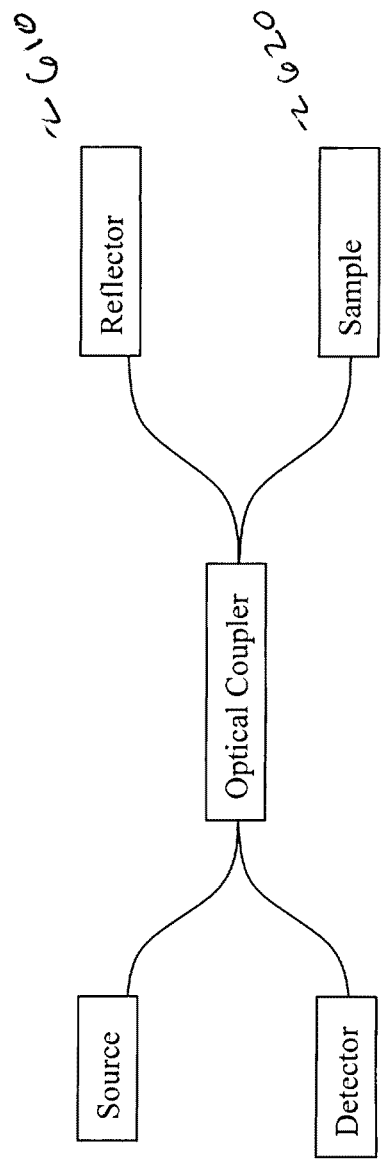
FIGS. 6a and 6b illustrate exemplary embodiments of an interferometer of an optical imaging system.
Figure 6B:
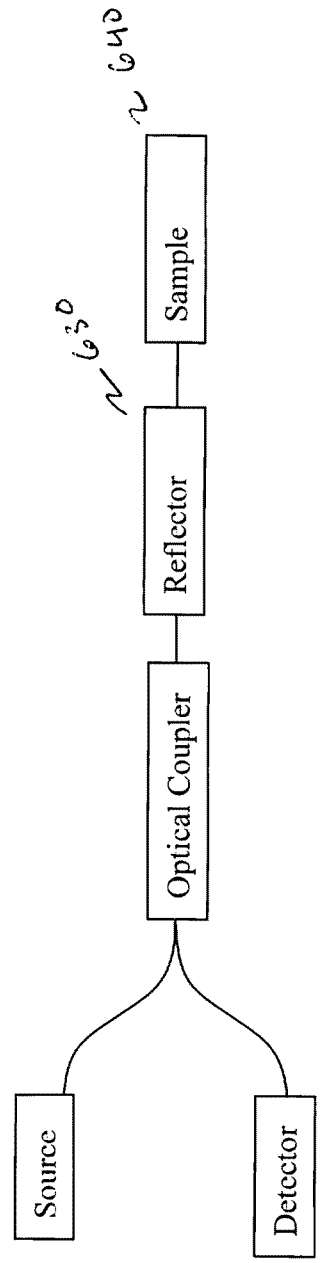

As shown in FIG. 6a, a Michelson interferometer may include an optical path leading to a reference optical reflector 610, an optical path leading to a sample 620 to be imaged, and an optical path where the light from the sample and the reflector interfere to produce interference fringe signals. In addition as shown in FIG. 6b, the optical path leading to the reference reflector 630 and optical path leading to the sample 640 can share a same optical path, forming a common path interferometer. The reference reflector in either the Michelson type or common path type or any other type interferometers is a fixed single reflection surface, or has multiple reflection surfaces from known depths, or the position of the reflector is programmable.

The frequency clock modules shown in FIGS. 7a and 7b may use a fixed or variable delay optical interferometer to monitor the output frequency of the source. Thus, FIG. 7a, for example, shows a variable delay Mach-Zehnder interferometer (MZI), while FIG. 7b depicts a fixed delay MZI frequency clock. The MZI has a balanced output to suppress the common mode signals and enhance the interference fringe signals. Other embodiments of the frequency clock module include an optical interferometer with at least one known delay that is fixed or variable, a wavelength meter or an optical spectrometer, or the light source and the optical interferometer used in the same imaging system that have some residue interference effects within them.

Figure 8:
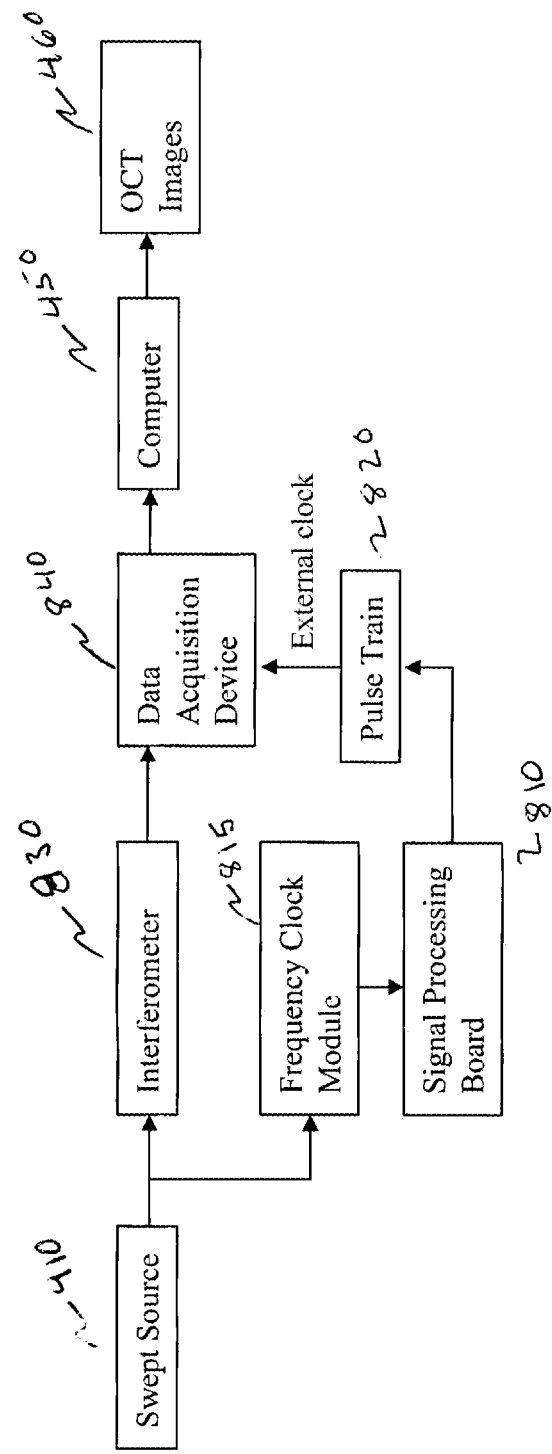
FIGS. 8-12 each illustrate exemplary embodiments of optical imaging systems according to the principles of the invention.

In another alternative embodiment of an optical imaging system, as illustrated in FIG. 8, the frequency clock signals from the frequency clock module 815 are processed by an electronic signal processing board 810 to produce a pulse train 820 indicating a relationship between an output frequency of the source and time. As shown in FIG. 8, the signal processing board 810 processes the frequency clock signals to produce a pulse train 820. The pulses in the pulse train 820 indicate when the output optical frequencies of the source have a linear relationship. The pulse train 820 is connected to the external clock input of the DAQ device 840 to externally clock the DAQ system 840 to sample the OCT signals from the interferometer 830.

Figure 9:
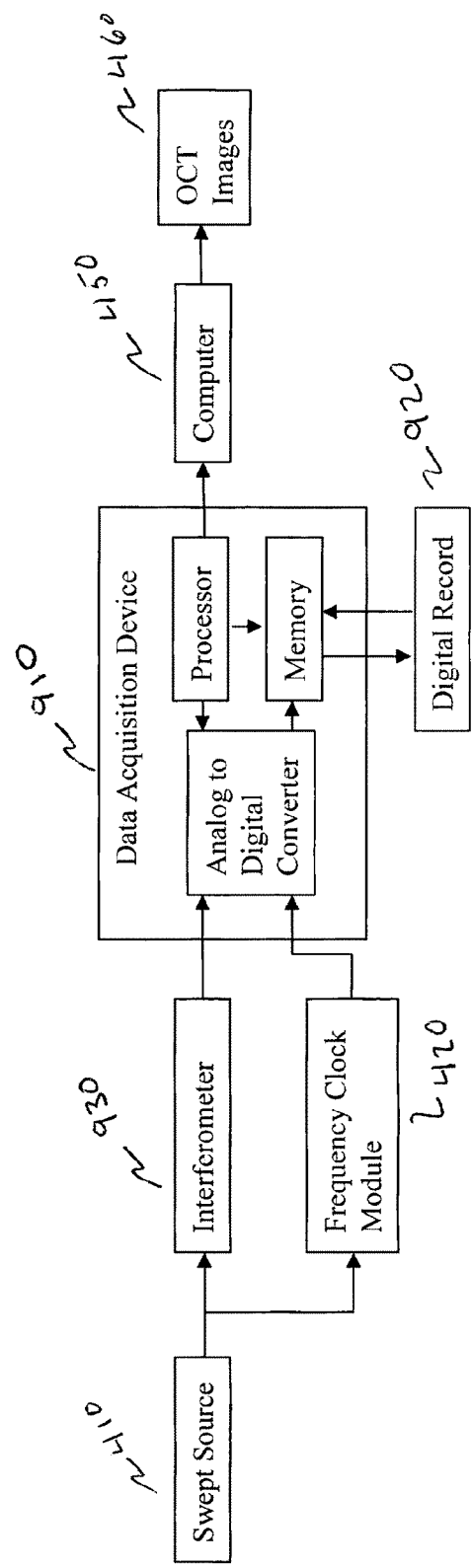

FIG. 9 is an embodiment of a system for performing optical imaging of a sample. In this embodiment the DAQ device 910 processes the frequency clock signals to generate a digital record 920 containing the frequency-time relationship information of the source. The digital record is updated after every source sweep or after a certain number of source sweeps, and is used as a reference to control the sampling of the OCT signals coming from the interferometer 930.

Figure 10:
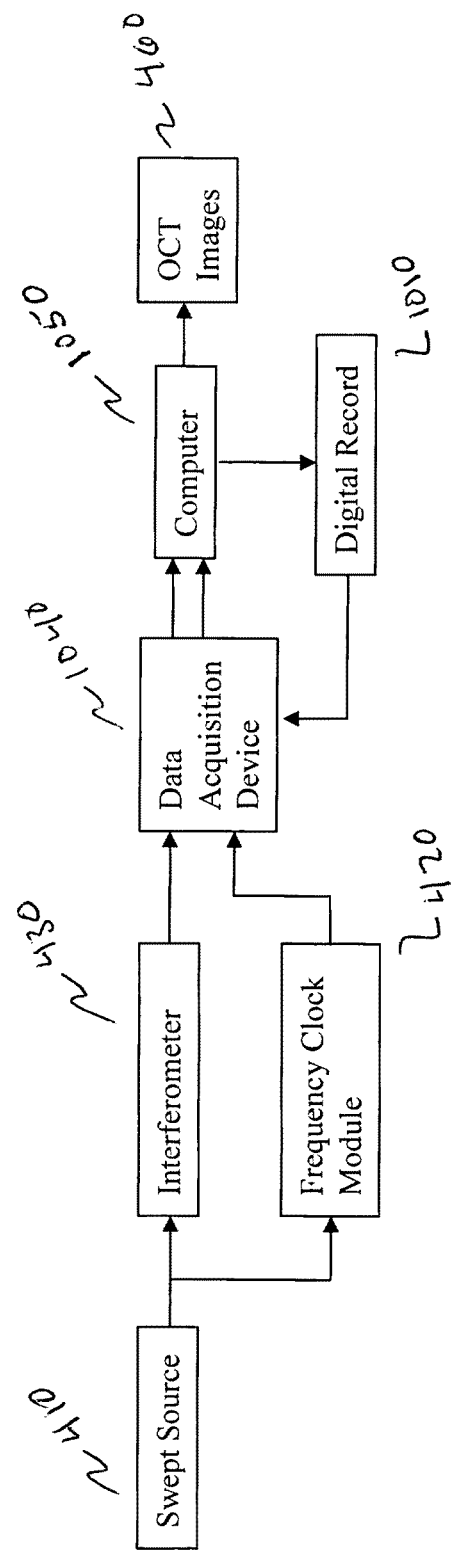

FIG. 10 is an embodiment of a system for performing optical imaging of a sample. In this embodiment the digital record 1010 containing the frequency-time relationship of the source is generated by the software processing, for example in computer 1050, of the frequency clock signals after the signals are digitized by the DAQ device 1040 and transferred to computer memory. The digital record is uploaded to the DAQ device 1040. Using the uploaded digital record as a reference, the DAQ device 1040 acquires the OCT signals and selectively transfers the sampled data points to PC memory or disk files which are accessible to the software. The DAQ device 1040 is configured to use a fixed frequency sampling clock that is either internal or external to the device 1040.

Figure 11:
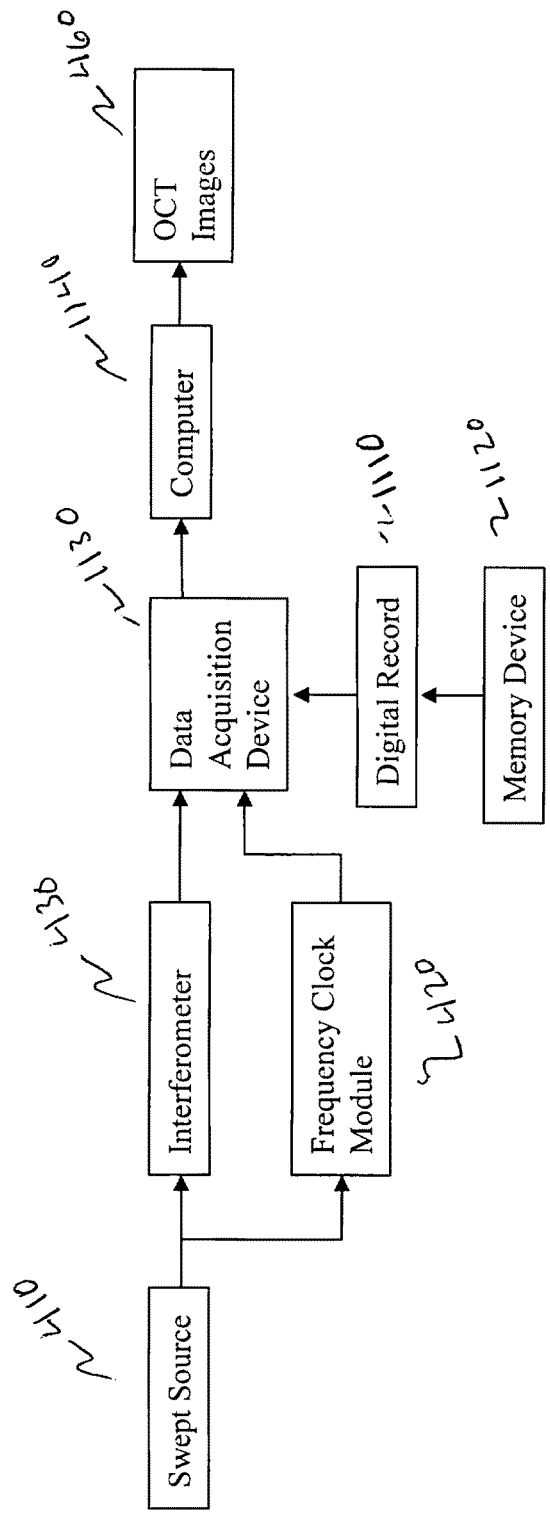

In another embodiment of the imaging system as shown in FIG. 11, the digital record 1110 containing the frequency-time relationship of the source is saved in a memory device 1120 either as in the computer memory or as in a disk file. The digital record 1110 is loaded to the DAQ device 1130 and stored in an on-board memory buffer of the DAQ device 1130, or in other programmable data or code buffers of the DAQ device 1130. The DAQ device 1130 acquires the OCT signals and selectively transfers the data points to computer memory 1140 for further processing.

Figure 12:
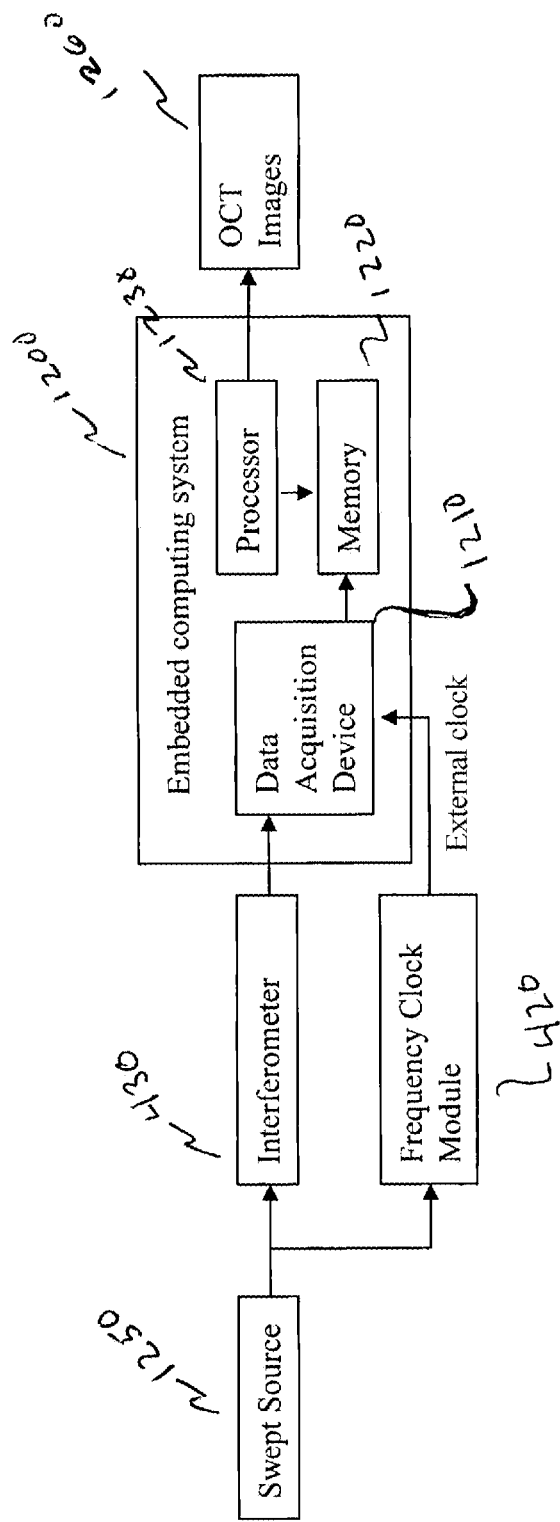

In another alternative embodiment of the imaging system as shown in FIG. 12, a DAQ device 1210, memory devices 1220 and processors 1230 are embedded in one compact module or integrated into one board to form an embedded computing system 1200, or a single board computer system 1200. The DAQ device 1210 also can be a stand-alone device in communication with the embedded computing system 1200 or is a plug-in device installed inside a computer as a standard computer system configuration. The computing system 1200 has a number of memory devices 1220 that are accessible to both the DAQ device 1210 and the processor 1230 which is controlled by software. The software controls the data acquisition process of the DAQ device 1210 which is externally clocked by the frequency clock signals of the light source 1250. The software processes the data points transferred from the DAQ device 1210 to memory and generates multi-dimensional OCT images 1260. The software also provides an operational interface for a user to control the imaging system.

In an embodiment illustrative of a method according to the principles of the invention as shown in FIG. 13, the data acquisition routine 1310 and signal processing routine 1320 are configured in parallel. For example, a DAQ device starts the data acquisition routine 1310; and, without waiting for the data acquisition routine 1310 to be finished, the signal processing routine 1320, to process the previously acquired data stored in memory, is started. The status of both routines 1310 and 1320 is checked. As shown in block 1330, when the routines 1310 and 1320 are finished the method proceeds to constructing a new OCT image 1300. The method may be executed by hardware, software or a combination thereof. The software may be embodied in a computer readable medium, which, when executed by a processor or control system, causes the method to be executed.

Figure 14:
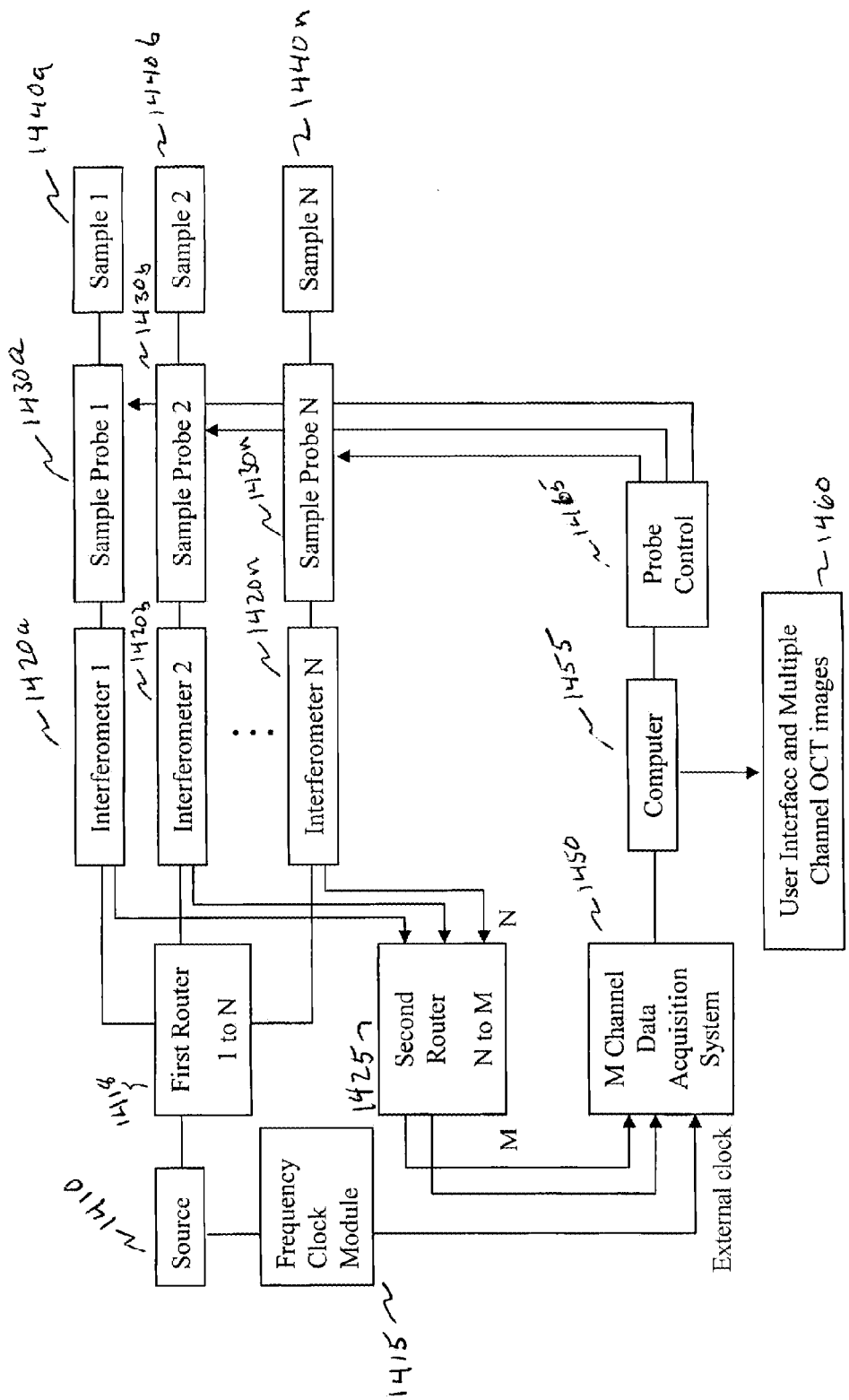
FIGS. 14-16 each illustrate exemplary embodiments of multiple-channel optical imaging systems according to the principles of the invention.

In the embodiment shown in FIG. 14, a system provides optical images of samples 1440a-1440n using multiple imaging channels. This system includes an optical radiation source 1410, such as a swept source. The system also includes a frequency clock module 1415 monitoring the output optical frequency of the source 1410. A plurality of optical interferometer modules 1420a-1420n are also provided. A first router 1418 distributes the output power of the optical source 1410 to the plurality of interferometers 1420a-1420n and a second router 1425 distributes outputs of the plurality of interferometers 1420a-1420n to a data acquisition (DAQ) system 1450. The DAQ system 1450 converts the OCT signals from the plurality of interferometers 1420a-1420n to OCT data points, triggered by the frequency clock signals. Over-sampling of the OCT signals improves the signal quality and OCT image quality. The software executed by computer 1455 processes the OCT data points and generates multi-dimensional OCT images 1460 for multiple imaging channels. The software also provides an operation interface 1460 for the user to control the imaging system. If the DAQ system 1450 has a sufficient number of sampling channels for the all the interferometers 1420a-1420n, the second router 1425 is not required. The computer 1455 also controls the probe control 1465 and sample probes 1430a-1430n.

The system of FIG. 14 may further includes an optical radiation source, a frequency clock module both having similar properties as discussed above with regard to FIG. 5 (broadband source 510 and frequency clock module 520). The first stage of routers 1418 of FIG. 14 may be an optical switching device that switches the output of the optical source among input ports of the plurality of interferometers 1420a-1420n, or an M×N optical coupling device that couples the output of the optical source to multiple interferometer input ports. The plurality of optical interferometers 1420a-1420n of FIG. 14 is composed of multiple optical interferometers. Each optical interferometer may include a reference optical reflector, an optical path leading to the reflector, an optical path leading to a sample to be imaged which is labeled as sample probe 1430a-1430n in this figure, and an optical path where the light from the sample and the reflector interfere to produce interference fringe signals. Each optical interferometer has similar properties as discussed above with regard to FIG. 5.

Figure 15:
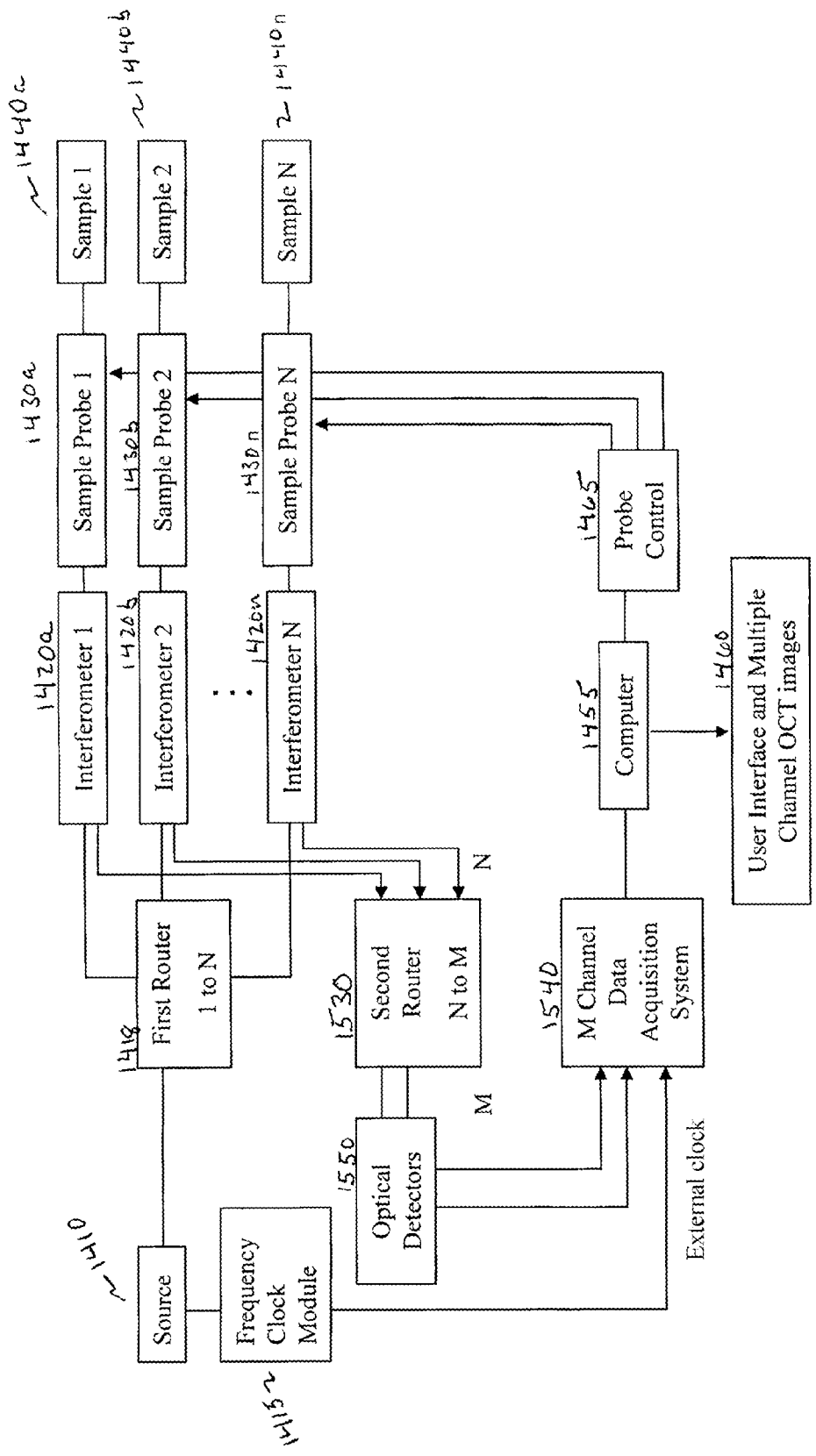
Figure 16:
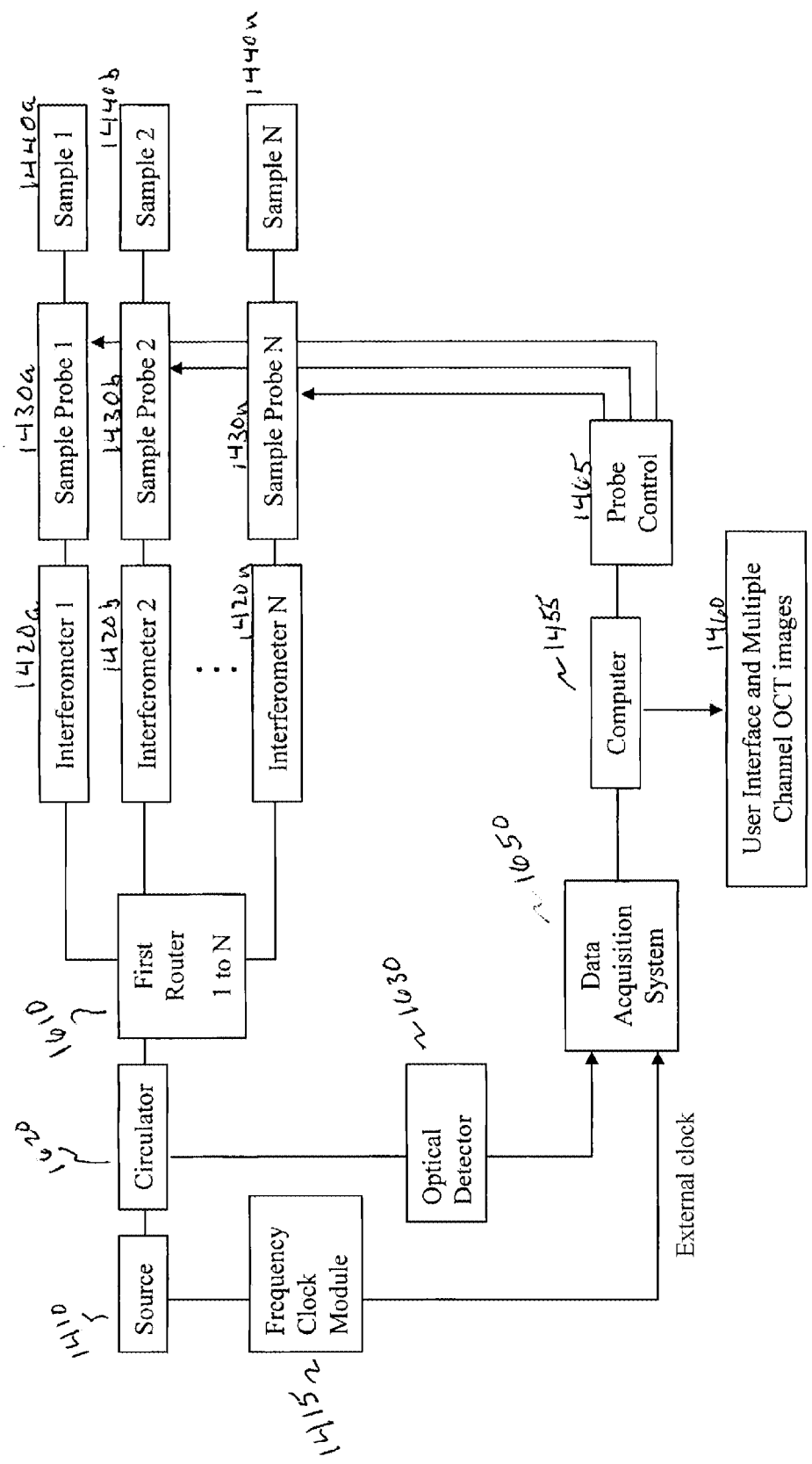

In the embodiment shown in FIG. 15, the second router 1530 is an optical switching device that switches the optical interference fringe signals from multiple interferometers 1420a-1420n to multiple optical detectors 1550, and the multiple optical detectors 1550 convert the optical signals to electric signals, and the electric signals are connected to the multi-channel DAQ device 1540. Alternatively, the second router 1530 can be an electric switching device that switches the OCT signals from multiple interferometers, when every interferometer has its own detector to convert the optical interference signals to electric signals, to the multi-channel DAQ device. In an example alternative embodiment illustrated in FIG. 16, the first and second routers of FIG. 15 can be the same optical switching device illustrated as first router 1610 of FIG. 16. An optical beam splitter or an optical circulator 1620 is used to direct the optical output of the interferometers to the detector 1630 to convert the optical signals to electric signals. The electric signals are connected to the multi-channel DAQ device 1650.

In another embodiment of the system depicted in FIG. 14, the DAQ system is composed of multiple DAQ devices with communication capabilities among the DAQ devices. Each DAQ device has similar properties as discussed above with regard to FIG. 5. The data from different imaging channels are either time encoded or data acquisition channel encoded. As described above a computer system and DAQ system may be a combination of software and hardware, integral or separate.

In a further embodiment of the system of FIG. 14, the data from different imaging channels are time encoded or DAQ channel encoded. The time encoded information allows the data of any channel be recovered when the switching devices in the first and second routers are activated to enable that particular channel. The DAQ channel encoded information allows the data of any channel be recovered from a known hardware connection method. The embodiment shown in FIG. 14 is demonstrated for a multi-channel imaging system based on one optical radiation source. This configuration can be easily expanded to support multiple optical radiation sources of same center wavelength or different center wavelength in one system, with each optical radiation source requires its own frequency clock module.

4. External Clocking Versus Internal Clocking

A data acquisition device can be considered as a functional module that requires certain input and output signals to work. The input signals include the analog signals from multiple channels which are the signals to sample, the trigger signals which tell when to start the data conversion process, and the clock signals which is the time-base used to determine the rate to sample the data for all channels simultaneously. The output signals are the converted digital signals representing the input analog signals.

Typically, a data acquisition device uses an internal sample clock to determine the rate to sample all analog input channels. The internal sample clock is usually generated by an on-board clock circuit such as a crystal oscillator. The crystal oscillator generates fixed frequency pulse train signals with equal time spacing between adjacent pulses. When using this fixed frequency pulse train as the sample clock for the analog to digital conversion process, the converted digital data points are also equally spaced in time.

However, there are occasions when using an external clock source is advantageous, especially when sampling a signal where an irregular sampling period is necessary. It is important to configure the system so that the incoming signal to be sampled is accompanied by an external pulse train. The external pulse train acts as the external sample clock. The clock pulses have irregular time periods indicating the time to perform the analog to digital conversion process. Each pulse of this signal is used to sample data for all channels simultaneously.

In swept source OCT imaging system, the Fourier domain OCT algorithm requires the sampled data points of OCT interference fringe signals to be equally spaced in optical frequency domain. However, due to many different frequency tuning mechanisms used by swept sources, the output frequencies of the swept sources are usually not linear in time. When using an internal clock to sample the OCT interference fringe signals, the sampled data points are linear in time but are not linear in optical frequency. Therefore, post signal processing steps such as numerical remapping process is needed to convert the sampled data points from time to optical frequency domain. Please note the optical frequency has a linear relationship with the wave number.

Current technology (e.g., US Patent Application Publication 2005/0171438) uses numerical remapping process to convert the sampled data points from time to optical frequency domain. However, in order to cancel the distortion originating from the nonlinearities in the wave number function, the data has to be numerically remapped from uniform time to uniform wave number space based on the wave number function which is determined by a spectra calibration process. It is clear that in the current system and method, the acquired data can be nonlinear in wave number and need the numerical remapping process. In order to perform the compensation, current technology requires the measurement of the laser output frequency function k(t) which is the relationship of laser output frequencies as a function of time. The numerical remapping process is done by some sort of algorithm to convert the data from time to optical frequency domain.

An embodiment of the invention provides the method that uses an external circuit board to process the frequency clock signals of the swept source, and produce a pulse train indicating the relationship of the output optical frequencies of the source and time. The pulse train is connected to the external clock input of the DAQ device. The analog to digital data conversion happens exactly at the time that each pulse occurs. Depending on the circuit board design, we can choose either the rising edge or the falling edge of the pulses to externally clock the data acquisition of all analog input channels simultaneously. Because the output frequency and time relationship of the source is contained in the irregular spacing of the pulses in the pulse train, the swept source output frequencies are linear at each rising edge or falling edge of the pulses in the pulse train. Therefore the sampled data are equally spaced in optical frequency domain automatically. There is no need to perform numerical remapping of the data from uniform time to uniform wave number space. There is also no need to measure the laser output frequency function k(t) which is required for the remapping process. The circuit board can work with different types of swept sources without measuring their individual k(t) functions.

Therefore, in contrast to the existing approach, the disclosed method in this disclosure does not require the remapping process because the acquired data are equally spaced in optical frequency domain automatically; and it does not require the measurement of the function k(t) of the swept sources either.

5. Long Coherent Length Swept Source

In one embodiment, this method is used for high speed, long range OCT imaging, in which a special swept source that supports long coherence length at high sweep speed is employed. This method requires the swept source to support >20 mm long coherence length, >100 nm tuning range at sweep rate higher than 100,000 A-scans per second.

Long coherence length is an important specification in OCT imaging applications utilizing the external clocking method. The relationship between the coherence length and the average instantaneous line width of the swept source is given by $$L_c = \frac{2\ln 2}{\pi} \frac{\lambda^2}{\Delta\lambda},$$

where $\lambda$ is the center wavelength of the swept source and $\Delta\lambda$ is the instantaneous line width of the source averaged over the whole sweep. In experiment, the coherence length of the swept source is measured as the path length difference in the interferometer arms where the interference fringe contrast drops to 50% of the fringe contrast at zero path length different of the interferometer. Fourier domain OCT theory requires the OCT fringe signals to be sampled in optical frequency domain with even frequency spacing of the data points. The denser the sampling frequency (the smaller frequency spacing of sampled data points) the larger the depth range can be measured and displayed on the OCT images. Long coherence length of the swept source allows good interference fringe contrast at long delay of the interferometer. Good interference fringe contrast at long delays allows the electronics circuit to process the signals and generate the very accurate pulse train containing enough number of pulses to enable dense sampling of OCT fringe signals.

This disclosure describes the coherence length impact on OCT image quality when applying the "external clocking" method on two swept sources of different coherence length specs. The two swept sources are running at the same speed of 100,000 A-scans/second. The first swept source is a piezo tuning VCSEL swept source with coherence length measured longer than 20 mm, and the second swept source is piezo tuning Fabry-Perot swept source with coherence length measured to be about 8 mm. Both sources are connected to a 25 GHz frequency spacing Mach-Zehnder interferometer to generate the frequency clock signals. The frequency clock signals are processed by an electronics circuit to generate the digital pulse trains indicating the relationship of output frequency and time of the sources. The pulse train is connected to the external clock input channel of the DAQ device to externally clock the data acquisition of OCT signals. The acquired OCT data is processed by computer software to generate OCT images. Except for the two different swept sources used, all the other modules used in this experiment are the same.

Figure 17A:
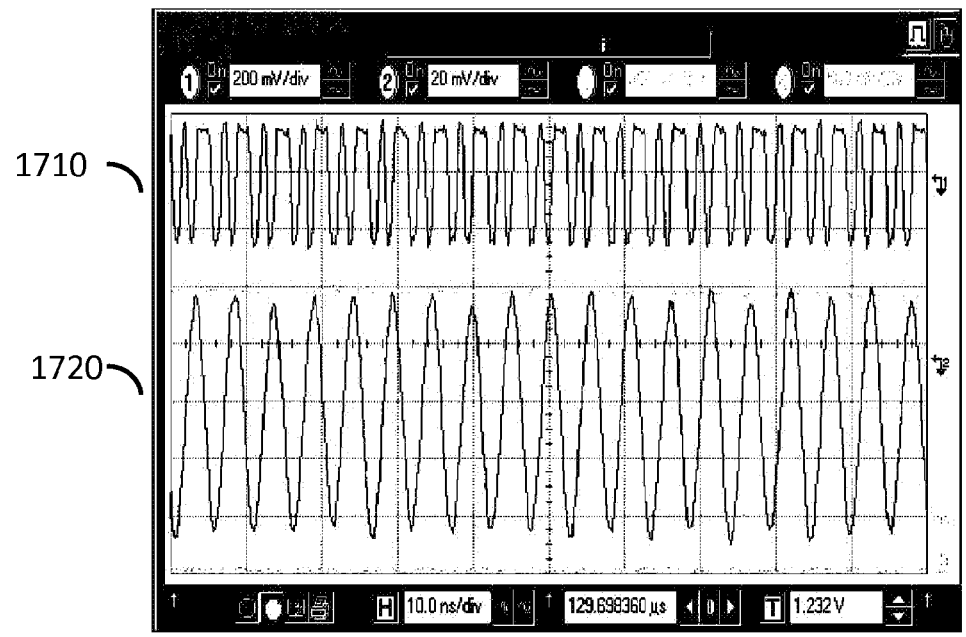
FIG. 17a shows the frequency clock signals and the clock pulse train generated from the piezo tuning VCSEL swept source with coherence length longer than 20 mm.
Figure 18B:
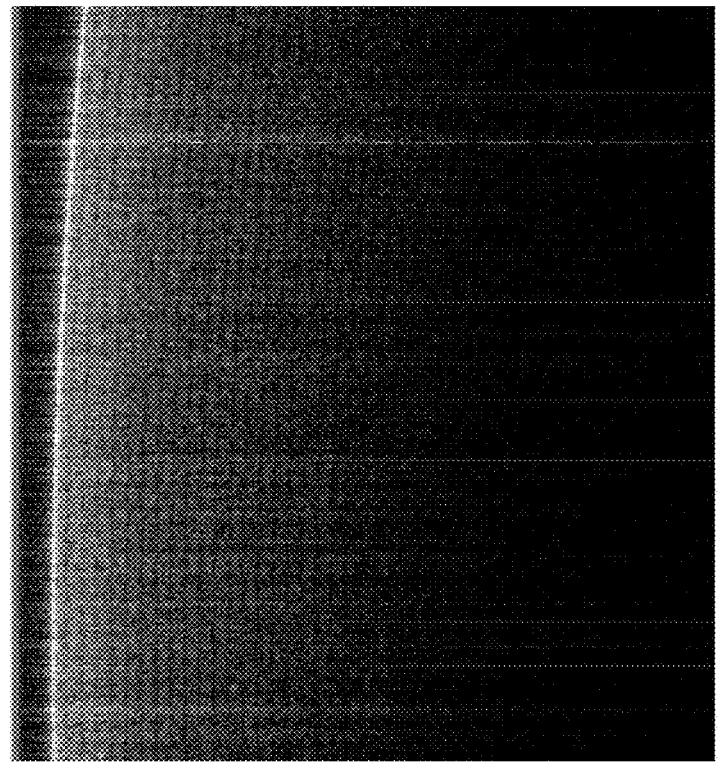
FIG. 18b show the OCT images from a tape sample for swept source with coherence length about 8 mm.
Figure 18A:
FIG. 18a shows the OCT images from a tape sample for swept source with coherence length longer than 20 mm.

FIG. 17a shows the frequency clock signals and the clock pulse train generated from the piezo tuning VCSEL swept source with coherence length longer than 20 mm. The 25 GHz frequency clock signals 1720 (green trace) has very good fringe contrast. The circuit board processes these fringe signals to generate the clock pulse train 1710 (yellow trace) with two pulses per fringe cycle precisely. When connecting this pulse train to the external clock input of the DAQ card we obtain very good OCT images from a tape sample like shown in FIG. 18a.

Figure 17B:
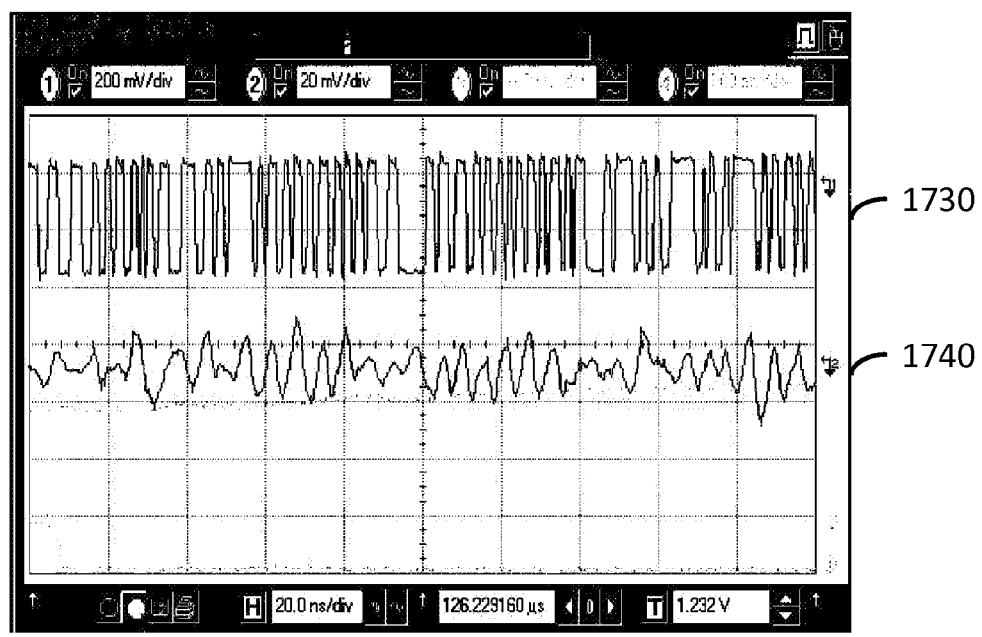
FIG. 17b shows the frequency clock signals and the clock pulse train from the piezo tuning Fabry Perot swept source with coherence length about 8 mm.

FIG. 17b shows the frequency clock signals and the clock pulse train from the piezo tuning Fabry Perot swept source with coherence length about 8 mm. The 25 GHz frequency clock signals 1740 (green trace) have limited fringe contrast and large noise because of the limited 8 mm coherence length of the laser. The circuit board processes these fringe signals to generate the clock pulse train 1730 (yellow trace) with missing clock pulses where the fringe contrast reduces and noise becomes large. When connecting this pulse train to the external clock input of the DAQ card we obtain noisy OCT images from the same tape sample shown in FIG. 18b. Note the total imaging depth in the sample is also smaller compare to FIG. 18a.

The above are some unique advantages of using external clock module to externally clock OCT data acquisition with a special swept source that supports long coherence length at high sweep speed.

In an embodiment of the present invention, some or all of the method components are implemented as a computer executable code. Such a computer executable code contains a plurality of computer instructions that result in the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPU"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing appropriate software. Other hardware, conventional and/or custom, may also be included. When provided by a processor, the functions may be provided by a single dedicated processor, by a single shared processor, by a multi-threaded single processor, by a single processor with multiple processing cores, or by a plurality of individual processors, some of which may be shared. Explicit use of the term "processor" or "controller" should not be construed to refer exclusively to hardware capable of executing software, and may implicitly include, without limitation, digital signal processor hardware, ROM, RAM, and non-volatile storage.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system to perform optical imaging of a sample, comprising:
   an optical radiation source outputting optical frequencies as a function of time;
   a frequency clock module monitoring the output optical frequencies of the optical radiation source, and outputting frequency clock signals;
   a signal processing circuit processing the frequency clock signals to produce a pulse train indicating a relationship of output optical frequencies of the source and time;
   a data acquisition (DAQ) device adapted for an analog to digital conversion process and externally clocked by the pulse train, wherein the pulse train is connected to an external clock input of the DAQ device;
   an optical interferometer in connection with the optical radiation source and the sample, wherein the optical interferometer outputs interference signals containing information about the sample, and the interference signals are connected to input channels of the DAQ device; and
   a processor controlling the DAQ device, processing the data transferred from the DAQ device and constructing multi-dimensional images of the sample;
   wherein the signal processing circuit compares the frequency clock signals with a reference voltage setting at zero, such that all zero-crossings in the clock signals are converted into pulses to produce a pulse train indicating the time when the output optical frequencies of the source have a linear relationship.

2. The system as claimed in claim 1, wherein the optical radiation source supports a coherence length longer than 20 mm at a sweep rate higher than 100,000 A-scans/second.

3. The system as claimed in claim 1, wherein the frequency clock module is an optical interferometer with at least one known delay that is fixed or variable, a wavelength meter or an optical spectrometer.

4. The system as claimed in claim 1, wherein the frequency clock module is integrated in the optical radiation source or the optical interferometer, and wherein the frequency clock signals are obtained from some residue interference effects within the optical radiation source, or some residue interference effects in the optical interferometer.

5. The system as claimed in claim 1, wherein the output pulse train of the signal processing circuit is connected to the external clock input of the DAQ device to sample all input channels simultaneously, and the analog to digital data conversion happens at the time of each pulse in the pulse train.

6. The system as claimed in claim 5, wherein the signal processing circuit includes one or more of the following circuits to process the frequency clock signals to produce a pulse train indicating the time when the output optical frequencies of the source have a linear relationship:
   a divider circuit that normalizes the frequency clock signals to a time dependent power curve of the source;
   a band-pass filter that rejects low frequency and high frequency noises on the frequency clock signals;
   a zero-crossing detection circuit processes the frequency clock signals to produce digital clock pulses indicating the time when the output optical frequencies of the source have a linear relationship; and
   a frequency doubling circuit that doubles the frequency of the digital clock pulses, using digital logic circuits to combine two sets of pulses that are phase shifted by 90 degrees.

7. The system as claimed in claim 1, wherein the optical interferometer comprises:
   a reference reflector;
   an optical path leading to the reference reflector;
   an optical path leading to a sample to be imaged;
   an optical path where the light from the sample and the reflector interfere to produce interference fringe signals; and
   a detector to convert the optical interference fringe signals to electric signals input to the DAQ device.

8. The system as claimed in claim 7, wherein the optical path leading to the reference reflector and optical path leading to the sample share a same optical path.

9. The system as claimed in claim 7, wherein the reference reflector comprises one of: a fixed position single reflector, multiple reflectors from known positions, and a reflector with programmable positions.

10. The system as claimed in claim 1, wherein the DAQ device uses the pulse train connected to the external clock input of the DAQ device as the time base to sample all signal channels, converts the input analog channels into digital data points, and transfer the digitally converted data points to a computer memory.

11. The system as claimed in claim 1, wherein the DAQ device converts the input analog channels into digital data points, the DAQ device has an on-board processor and memory, and wherein the on-board processor processes the digitally converted data points according to a digital record stored in the DAQ memory, and wherein the digital record containing the relationship of output optical frequencies of the source and time, the digital data points processed by the DAQ on-board processor are transferred to computer memory.

12. A method of reducing the data transfer load from a data acquisition (DAQ) device to computer memory in an optical coherence tomography imaging system, the method comprising:
   running the DAQ device at any sampling frequency supported by the DAQ device to convert input analog signals to digital data points,
   connecting a pulse train to an external clock input of the DAQ device, the pulses in pulse train indicate the time when output optical frequencies of a source have a linear relationship, wherein the pulses in the pulse train are generated from all zero-crossings in the clock signals of the source when compared with a reference voltage setting at zero;

converting the input analog signals to digital data points in the DAQ device at each pulse in the pulse train; and transferring the converted data points to a computer memory.

13. A method of reducing the data transfer load from a data acquisition (DAQ) device to computer memory in an optical coherence tomography imaging system, the method comprising:

running the DAQ device at any sampling frequency supported by the DAQ device to convert the input analog signals to digital data points, loading a digital record from computer memory to the DAQ device, the digital record contains a linear frequency-time relationship of a source and can be modified by the DAQ device, wherein the digital record comprises pulses that are generated from all zero-crossings in the clock signals of the source when compared with a reference voltage setting at zero, converting the input analog signals to digital data points in the DAQ device, processing the converted data points in the DAQ device using the digital record as a reference; and transferring the converted data points to a computer memory, wherein the digital record is generated by one of:

the DAQ device processing the input signals to the DAQ device, computer software processing the data points from input channels to the DAQ device, and computer software loading a pre-saved copy from a memory device to the DAQ device.

* * * * *